United States Patent
Kroll et al.

(10) Patent No.: US 9,169,020 B2
(45) Date of Patent: Oct. 27, 2015

(54) AIRCRAFT PASSENGER SUITE SEATING ARRANGEMENT

(71) Applicant: B/E Aerospace, Inc., Wellington, FL (US)

(72) Inventors: Russell Kroll, Atlanta, GA (US); Suzuko Hisata, Atlanta, GA (US); Francis X. Garing, Atlanta, GA (US); Alexander Nicholas Pozzi, Winston-Salem, NC (US); Glenn Allen Johnson, Rural Hall, NC (US); Robert J. Henshaw, Newnan, GA (US); JaeHun Gu, Atlanta, GA (US); Benjamin D. Stephens, Atlanta, GA (US)

(73) Assignee: B/E Aerospace, Inc., Wellington, FL (US)

(*) Notice: Subject to any disclaimer, the term of this patent is extended or adjusted under 35 U.S.C. 154(b) by 10 days.

(21) Appl. No.: 13/799,372

(22) Filed: Mar. 13, 2013

(65) Prior Publication Data

US 2013/0248655 A1 Sep. 26, 2013

Related U.S. Application Data

(60) Provisional application No. 61/614,087, filed on Mar. 22, 2012, provisional application No. 61/614,106, filed on Mar. 22, 2012, provisional application No. 61/614,093, filed on Mar. 22, 2012, provisional application No. 61/614,096, filed on Mar. 22, 2012.

(51) Int. Cl.
*B64D 11/06* (2006.01)

(52) U.S. Cl.
CPC ............ *B64D 11/06* (2013.01); *B64D 11/0604* (2014.12); *B64D 11/0636* (2014.12); *B64D 11/0601* (2014.12)

(58) Field of Classification Search
CPC ........... B64D 11/06; B64D 2011/0069; B64D 2011/0658; B64D 2011/0621; B64D 11/0604; B64D 11/0602; B64D 11/0606
USPC ................................ 244/118.5, 118.6, 122 R
See application file for complete search history.

(56) References Cited

U.S. PATENT DOCUMENTS

| | | | |
|---|---|---|---|
| 2003/0085597 A1* | 5/2003 | Ludeke et al. | 297/184.14 |
| 2003/0218095 A1* | 11/2003 | Saint Jalmes | 244/118.5 |
| 2009/0050740 A1* | 2/2009 | Saint-Jalmes et al. | 244/118.6 |
| 2009/0166470 A1* | 7/2009 | Dryburgh et al. | 244/118.6 |
| 2010/0019086 A1* | 1/2010 | Ferry et al. | 244/118.5 |
| 2010/0140400 A1* | 6/2010 | Helfrich et al. | 244/118.6 |
| 2013/0241247 A1* | 9/2013 | Wallace et al. | 297/118 |
| 2014/0035330 A1* | 2/2014 | Henshaw | 297/174 R |
| 2014/0361585 A1* | 12/2014 | Henshaw | 297/174 R |

* cited by examiner

*Primary Examiner* — Rob Swiatek
*Assistant Examiner* — Magdalena Topolski
(74) *Attorney, Agent, or Firm* — Shumaker, Loop & Kendrick, LLP

(57) ABSTRACT

An aircraft passenger suite including one or more privacy walls arranged to define a seating area and a living area positioned to the side of the seating area, the seating area including a seat configured to achieve a horizontal bed position and the living area including at least one amenity for use by a passenger in the suite, the living area having a length substantially less than a length of the seating area such that the suite overlaps another suite in a longitudinal direction, and wherein an entrance to the suite is defined by a break in the one or more privacy walls.

11 Claims, 6 Drawing Sheets

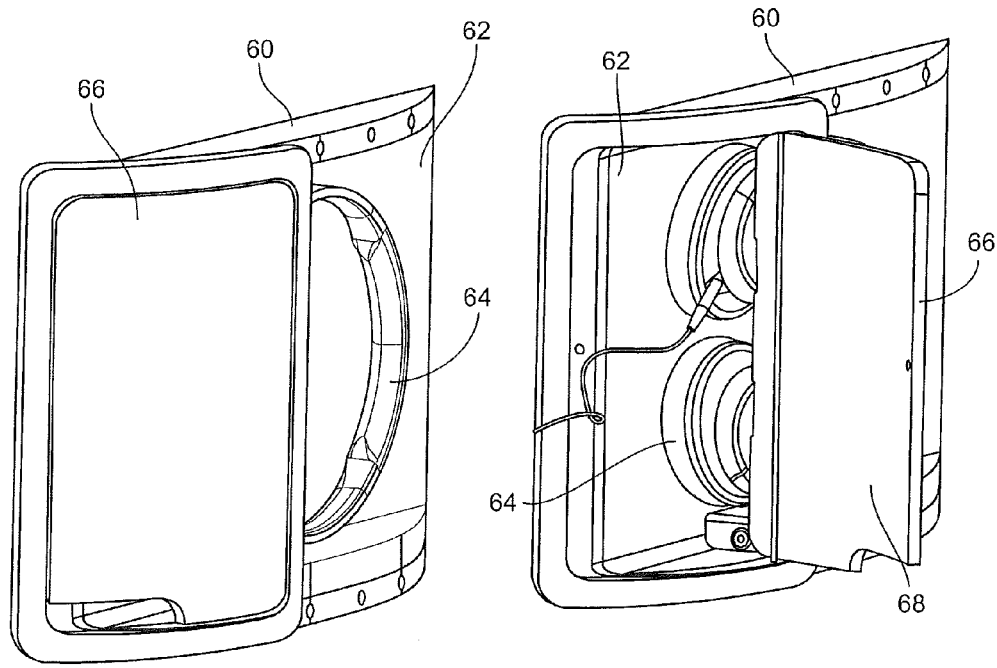
Fig. 8
Fig. 9
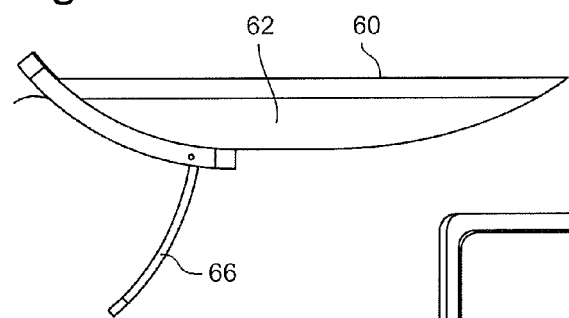
Fig. 10
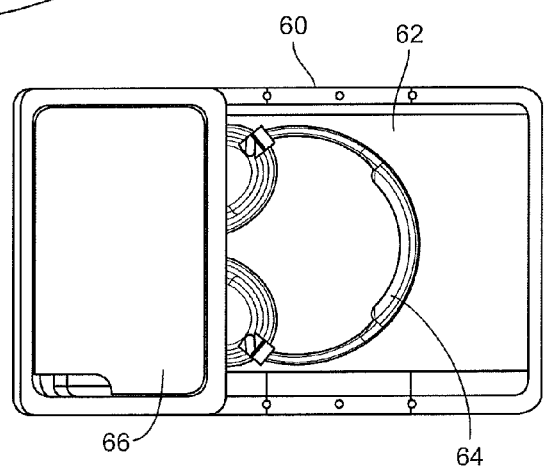
Fig. 11

AIRCRAFT PASSENGER SUITE SEATING ARRANGEMENT

CROSS-REFERENCE TO RELATED APPLICATIONS

This application claims priority to U.S. Application No. 61/614,087 filed Mar. 22, 2012, U.S. Application No. 61/614,106 filed Mar. 22, 2012, U.S. Application No. 61/614,093 filed Mar. 22, 2012, and U.S. Application No. 61/614,096 filed Mar. 22, 2012, the contents of which are incorporated by reference herein.

TECHNICAL FIELD AND BACKGROUND OF THE INVENTION

This invention relates generally to aircraft passenger seating arrangements, and more particularly, to a premium class aircraft passenger seating arrangement including at least one passenger suite outfitted with various features and amenities configured and arranged to enhance passenger convenience and comfort, as well as maximize the perceived openness of the suite.

Long haul international air carriers typically provide three classes of service for passengers: coach class, which accommodates the large majority of passengers at a relatively low fare and with minimal amenities; business class, which accommodates a relatively smaller number of higher fare-paying passengers with more amenities; and premium class, which accommodates relatively few passengers at relatively high fares with luxurious amenities, including premium food and beverages, large accommodation seating areas and the like. With the advent of larger long haul aircraft, more space is available for accommodating the travel preferences of premium class passengers who can afford to pay higher fares for more space, privacy, conveniences and luxuries.

With regard to premium class seating, to which the present invention is directed, individual suites defined by privacy walls offer passengers maximum levels of luxury and privacy. Each suite typically includes a lie-flat capable seat, audio/video equipment, and various storage compartments and working surfaces. While individual passenger suites are known, conventional arrangements do not maximize suite density, and do not maximize the use of space available while maintaining the perceived openness of the suites.

SUMMARY OF THE INVENTION

Therefore, it is an object of the present invention to provide a premium class aircraft passenger suite including numerous amenities and features for enhancing passenger comfort and convenience.

It is a further object of the invention to provide an aircraft passenger suite including numerous amenities that maximizes the use of available space while maintaining the perceived openness of the suite.

It is a further object of the invention to provide aircraft passenger suites that nest to maximize seating density.

It is a further object of the invention to provide two different suite configurations that nest in a column;

It is a further object of the invention to provide two different suite configurations that nest in a column, wherein the different suite configurations alternate within the column.

It is a further object of the invention to provide a seating arrangement including a plurality of columns including nesting suites, wherein adjacent suites of adjacent columns are mirror images of each other.

It is a further object of the invention to provide a seating arrangement including a plurality of adjacent columns each including nesting suites, wherein adjacent suites within each column and between columns share privacy walls It is a further object of the invention to provide a premium class passenger suite with amenities such as a lie-flat capable seat, a closet for stowing articles of clothing, a compartment for stowing a headset, a beverage bar, and a power/data communication port.

These and other features, objects and advantages are achieved by providing an aircraft passenger suite including one or more privacy walls arranged to define a seating area and a living area positioned to the side of the seating area, the seating area including a seat configured to achieve a horizontal bed position and the living area including at least one amenity for use by a passenger in the suite, the living area having a length substantially less than a length of the seating area such that the suite overlaps another suite in a longitudinal direction, and wherein an entrance to the suite is defined by a break in the one or more privacy walls.

In accordance with a further embodiment, the aircraft passenger suite may include a closet positioned to the side of the seat, an ottoman positioned forward of and apart from the seat, the ottoman and the seat residing in a common horizontal plane when the seat is in the horizontal bed position, and a video monitor positioned forward of the seat and vertically above the ottoman.

In accordance with a further embodiment, the at least one amenity in the living area may include a headset storage compartment recessed within the one or more privacy walls and accessible through a door that pivots open and closed.

In accordance with a further embodiment, the at least one amenity in the living area may include a beverage bar having a door configured to pivot open to provide an auxiliary horizontal table vertically spaced from an underlying countertop to permit simultaneous use of the auxiliary horizontal table and the underlying countertop.

In accordance with a further embodiment, the at least one amenity in the living area may include a combination power outlet and data port integrated into the one or more privacy walls and accessible through a vertically sliding cover.

In accordance with a further embodiment, the at least one amenity in the living area may include a suite control panel positioned forward of the seat in a location reachable by a seated passenger.

According to another embodiment of the invention, provided herein is a premium class aircraft passenger seating arrangement including a first suite bound by one or more privacy walls defining a seating area including a seat configured to achieve a horizontal bed position and a living area positioned next to the seating area and including at least one amenity for use by a passenger in the first suite, and a second suite adjacent the first suite and bound by one or more privacy walls defining a seating area and including a seat configured to achieve a horizontal bed position and a living area positioned next to the seating area and including at least one amenity for use by a passenger in the second suite, wherein the first and second suits share a wall separating the seating area of the first suite from the living area of the second suite and the living area of the first suite from the seating area of the second suit.

In accordance with a further embodiment, the first and second suites may overlap in a longitudinal direction to form a column of alternating first and second suites.

In accordance with a further embodiment, the seats in the first and second suites may face each other and may be laterally offset with respect to a longitudinal axis of the aircraft.

In accordance with a further embodiment, the entrance to the first suite may be through the seating area of the first suite and the entrance to the second suite may be through the living area of the second suite.

In accordance with a further embodiment, the living area of the first suite may share a privacy wall with a living area of a third suite that is laterally adjacent the first suite and is a mirror image of the first suite, and the seating area of the second suite may share a privacy wall with a seating area of a fourth suite that is laterally adjacent the second suite and is a mirror image of the second suite.

In accordance with a further embodiment, each of the first and second suites may include a closet positioned to the side of the seat, an ottoman positioned forward of and apart from the seat, the ottoman and the seat residing in a common horizontal plane when the seat is in the horizontal bed position, and a video monitor positioned forward of the seat and vertically above the ottoman.

In accordance with a further embodiment, the at least one amenity in the living area of each of the first and second suites may include a headset storage compartment recessed within the one or more privacy walls and accessible through a door that pivots open and closed.

In accordance with a further embodiment, the at least one amenity in the living area of each of the first and second suites may include a beverage bar having a door configured to pivot open to provide an auxiliary horizontal table vertically spaced from an underlying countertop to permit simultaneous use of the auxiliary horizontal table and the underlying countertop.

In accordance with a further embodiment, the at least one amenity in the living area of each of the first and second suites may include a combination power outlet and data port integrated into the one or more privacy walls and accessible through a vertically sliding cover.

In accordance with a further embodiment, the at least one amenity in the living area of each of the first and second suites may include a suite control panel positioned forward of the seat in a location reachable by a seated passenger.

Embodiments of the present invention may include one or more or any combination of the above features.

BRIEF DESCRIPTION OF THE DRAWING FIGURES

The present invention is best understood when the following detailed description of the invention is read with reference to the accompanying drawings, in which:

FIG. 8 is an isometric view of the headset storage compartment showing the compartment door closed;

FIG. 9 is an isometric view of the headset storage compartment showing the compartment door open;

FIG. 10 is a top plan view of the storage compartment showing the compartment door open;

FIG. 11 is a front elevation view of the storage compartment showing the compartment door closed.

DESCRIPTION OF THE PREFERRED EMBODIMENT AND BEST MODE

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, a passenger seating arrangement is shown including a plurality of individual passenger suites each bound by one or more privacy walls defining a seating area including a seat configured to achieve a horizontal bed position and a living area including at least one amenity for use by a passenger in the suite. The seating arrangement may be utilized in the premium class section of a commercial aircraft or other class section or conveyance. The seating arrangement includes nesting suites arranged in columns to maximize seating density and suite configurations that maximize the perceived openness of the suites.

Figure 1:
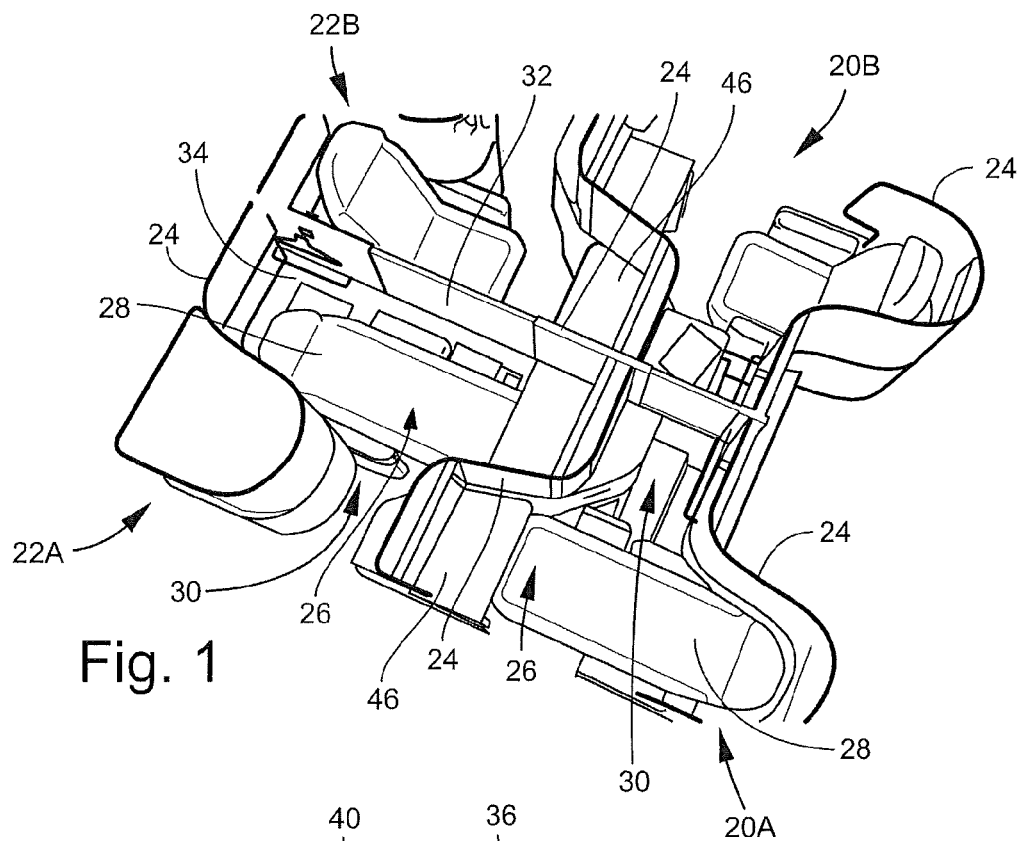
FIG. 1 is an overhead plan view of a plurality of suites in a nested arrangement according to a preferred embodiment of the invention.

Referring to FIG. 1, a passenger seating arrangement is shown including first and second nesting passenger suites 20A, 22A each bound by one or more privacy walls 24 defining a seating area 26 including a seat 28 configured to achieve a horizontal bed position and a living area 30 positioned next to the seating area and including at least one amenity for use by a passenger in the suite. The first and second suites 20A, 22A nest in a column arranged parallel to the longitudinal axis of the aircraft. The first and second suites 20A, 22A share a privacy wall 24 at one end that separates the seating area of the first suite from the living area of the second suite and the living area of the first suite from the seating area of the second suite.

The first and second suites 20A, 22A overlap in the longitudinal direction to form a column of alternating first and second suites including any number of suites. The seats 28 in the first and second suites 20A, 22A face each other and are laterally offset with respect to a longitudinal axis of the suites. The entrance to the first suite 20A is through the seating area 26 of the first suite, thus providing an 'outboard' seat, while the entrance to the second suite 22A is through the living area 30 of the second suite, thus providing an 'inboard seat, inboard and outboard defined with respect to the aisle.

The living area 30 of the first suite 20A shares a privacy wall 24 with the living area 30 of a third suite 20B in a laterally adjacent column. The third suite 20B is a mirror image of the first suite 20B about an imaginary line between the columns. The seating area 26 of the second suite 22A shares a privacy wall 24 with the seating area 26 of a fourth suite 22B in a laterally adjacent column and is a mirror image of the second suite. Thus, columns may be arranged parallel and adjacent to other columns with 'mirror-image' suites laterally aligned.

Privacy walls 24 between adjacent suites may include portions that can be opened/closed or raised/lowered to open the suites depending on the desired degree of privacy. Reference numeral 32, for example, designates a partition between suites 22A and 22B that can be opened.

Figure 3:
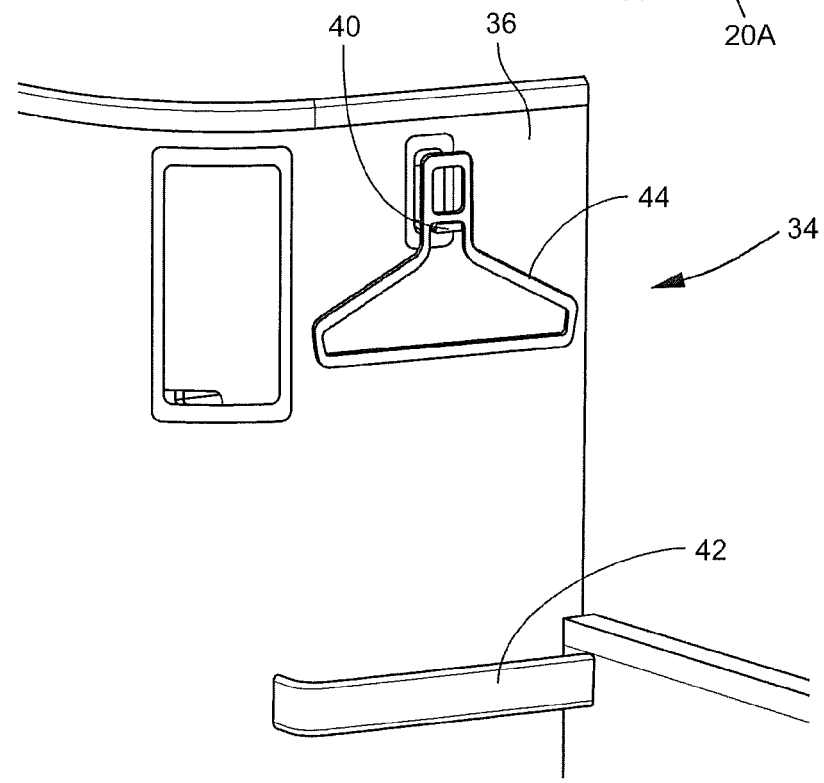
FIG. 3 is a detailed view of the closet portion of one of the suites of FIG. 1.
Figure 2:
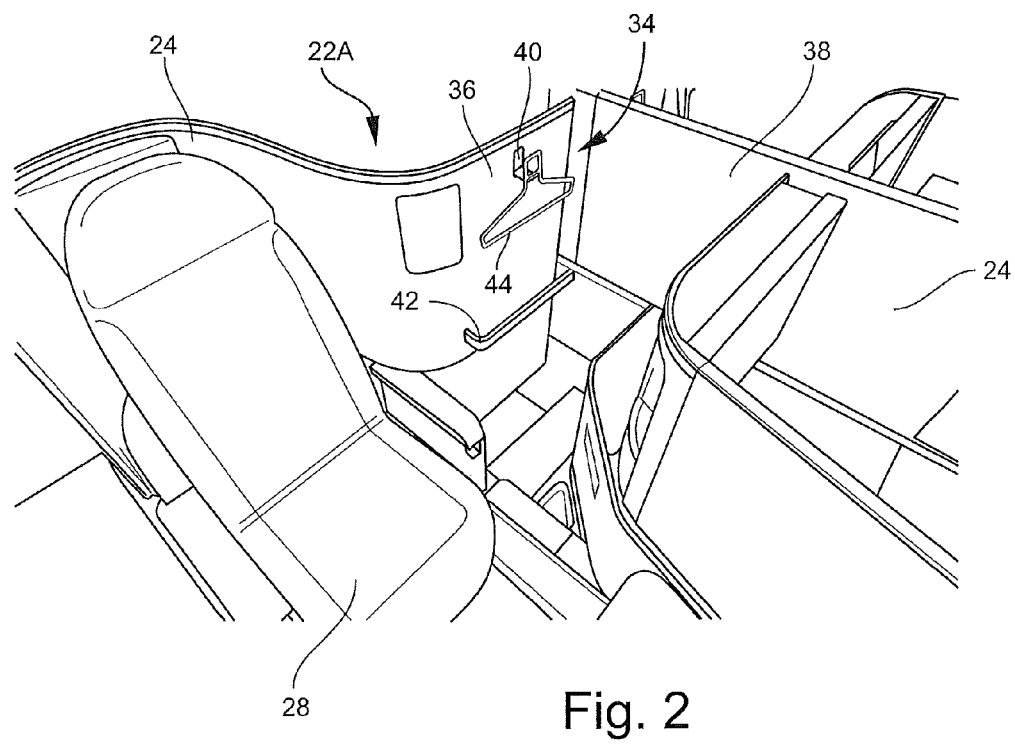
FIG. 2 is a perspective view of one of the suites of FIG. 1 from the perspective of the entrance.

Referring to FIGS. 2 and 3, one amenity associated with each suite 20A, 20B, 22A, 22B is a closet 34 for the neat and orderly stowage of garments. Suites 20A and 20B include a closet in the living are 30 that is open to the suite and is partly formed by the intersection of a rear privacy wall 36 defining the rear boundary of the suite and a side privacy wall 38 defining the side boundary of the suite. A generally linear portion of the rear privacy wall 36 adjacent the seat 28 and facing in the 'forward' direction serves as the mounting surface for closet accessories for hanging and stowing garments, bedding, etc. Suites 22A and 22B include a closet 34 in the seating area 26 positioned alongside the seat 28 and partly formed by the intersection of the side privacy wall defining the side boundary of the suite and the rear privacy wall defining the rear boundary of the suite, as shown in FIG. 1. A generally linear portion of the side privacy wall facing in the direction of the seat serves as the mounting surface for closet accessories for hanging and stowing garments, bedding, etc.

In either suite configuration, the accessories include a deployable hanger hook 40 positioned near the top of the privacy wall and a retention bar 42 positioned vertically below the hanger hook. The hanger hook 40 is configured to fold flush against the privacy wall when not in use and may be used by itself or to support a stowable hanger 44. The retention bar 42 may be used to hang items or to retain long items hung on the hanger hook 40 or hanger 44 substantially against the privacy wall, for example, suit coats. The space immediately forward of the privacy wall and below the retention bar 42 is preferably free space clear of obstructions so that garments and bedding can hang straight.

Figure 4:
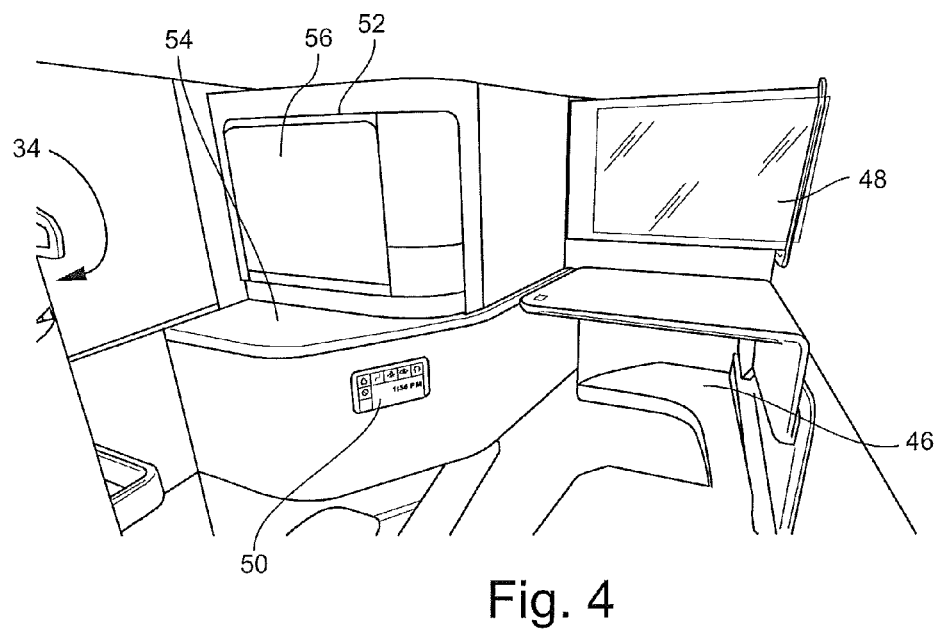
FIG. 4 is a perspective view of one of the suites of FIG. 1 from the perspective of the seat.

Referring to FIGS. 1 and 4, each suite 20A, 20B, 22A, 22B includes an ottoman 46 positioned forward of and apart from the seat 28. The ottoman 46 and the seat 28 reside in a common horizontal plane when the seat is in the horizontal bed position so that the ottoman and seat collectively form a bed. A video monitor 48 is positioned on the privacy wall 24 forward of the seat 28 vertically above the ottoman 46. A suite control panel 50 is positioned forward of the seat 28 in reach of a seated passenger.

Figure 5:
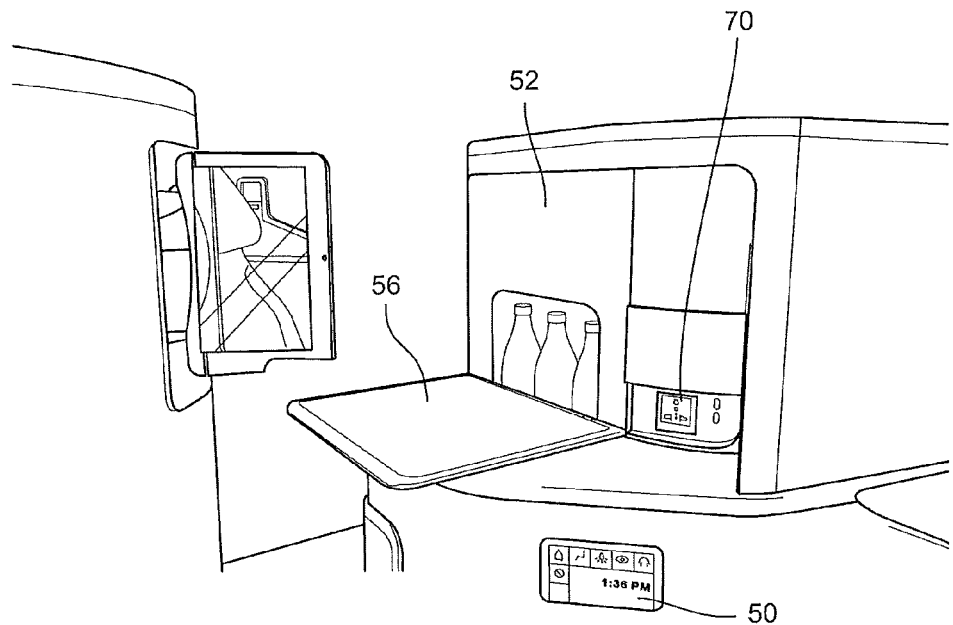
FIG. 5 is a detailed view of passenger amenities positioned to the side of the seat within one of the suites of FIG. 1.
Figure 6:
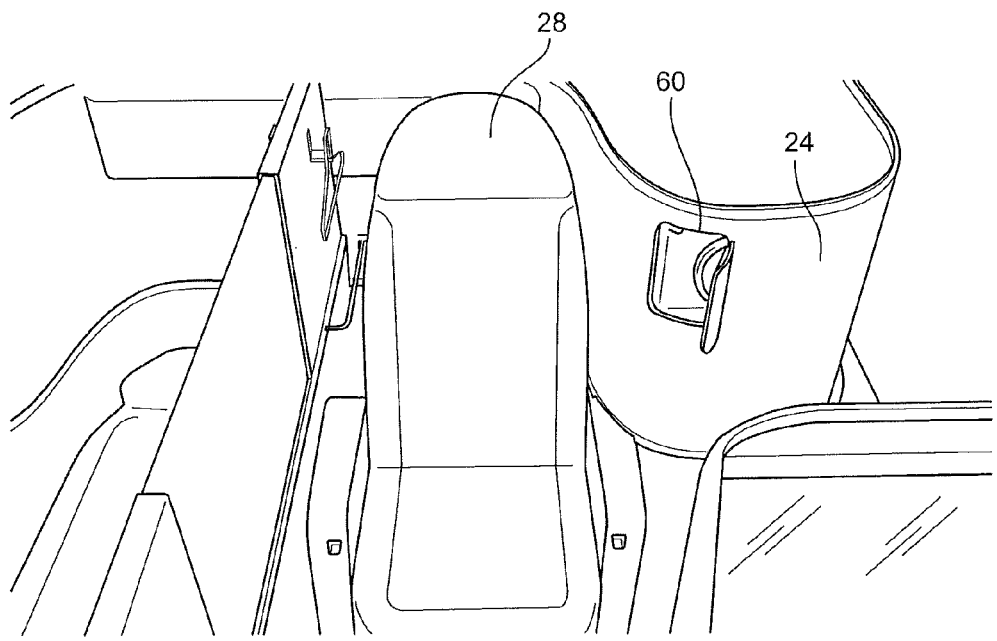
FIG. 6 is a perspective view of one of the suites of FIG. 1 from the perspective of an adjacent suite.
Figure 7:
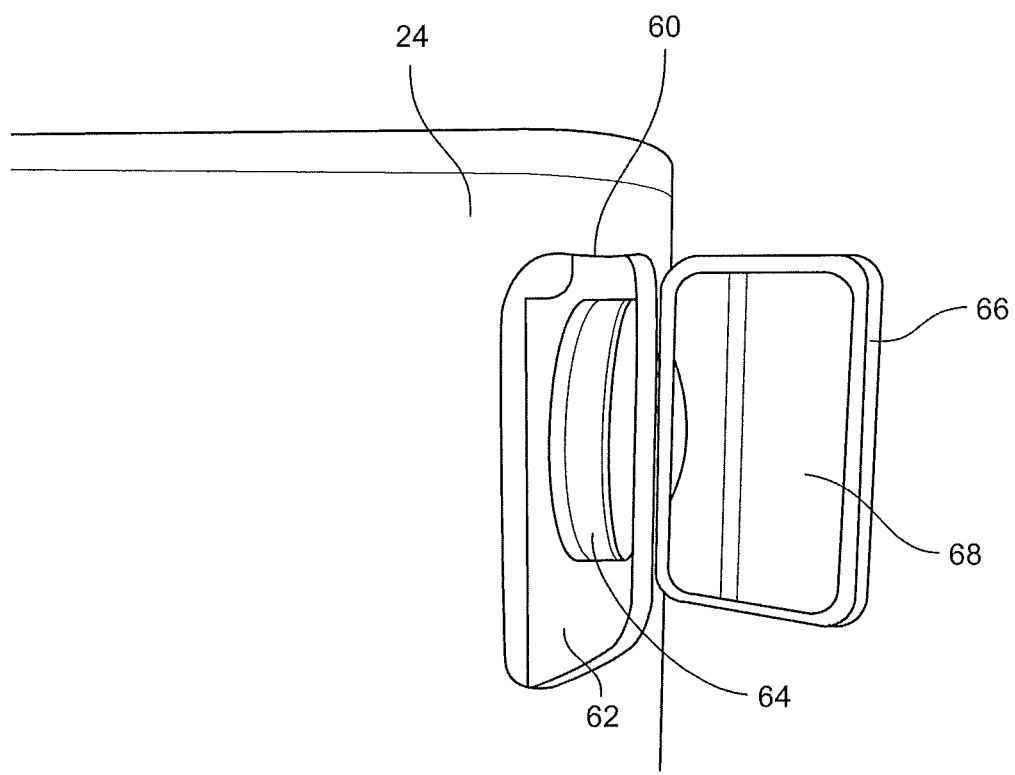
FIG. 7 is a detailed view of a headset storage compartment of one of the suites of FIG. 1.

Referring to FIG. 5, each suite 20A, 20B, 22A, 22B includes a beverage bar 52 having a door 56 configured to pivot open to provide an auxiliary horizontal table vertically spaced from an underlying countertop 54 to permit simultaneous use of the auxiliary horizontal table for beverages and the underlying counter for low-lying items such as cell phones, tablets, laptops and other items. The countertop 54 is positioned in the living area 30 to the side of and slightly forward of the seat 28. The beverage bar 52 is located in the living area 30 of the suite and is integrated into the cabinetry. The beverage bar 52 holds beverages and may include refrigeration for cooling the beverages. The door 56 may be insulated and provide a sealing function.

The door 56 is hinged along the bottom edge to the beverage bar cabinet and pivots vertically between opened and closed positions. The door 56 is positioned vertically in the closed position and horizontally in the open position. The door 56 is hinged to the beverage bar 52 at a position vertically above the countertop 54. The hinge may be configured or a stop may otherwise be provided for limiting pivoting movement of the door 56 to about 90 degrees such that the auxiliary table resides horizontally when fully open. The space between the underlying countertop 54 and the door 56 in the fully open position allows the passenger to simultaneously utilize the auxiliary table and the countertop. The beverage bar 52 may have a shallow depth and incorporate into its backside the video monitor of the adjacent suite.

Referring to FIGS. 6-11, each suite 20A, 20B, 22A, 22B includes a headset storage compartment 60 integrated into a privacy wall 24 that exploits the air space between the layers of the wall. The headset storage compartment 60 generally includes a tray 62 open on one major side that has a depth sufficient to receive and maintain a headset 64 therein. The headset storage compartment 60 is shaped to follow the curvature of the privacy wall 24. The headset storage compartment 60 is mounted vertically and includes a door 66 pivotally attached to the front of the tray 62. A portion of the tray 62 is inserted beneath the privacy wall 24 such that the tray, door and privacy wall collectively define a horizontal pocket for receiving the headset 64. A latch (not shown) may be provided for holding the door closed. The headset storage compartment 60 mounts substantially flush with the privacy wall 24. The headset 64 may be of the type having pivoting earphones configured to fold flat to maximize the number of available mounting locations and minimize the depth of the tray 62. The shape and depth of the tray 62 may be customized based on the size, shape and depth of the privacy wall and the size of the headset stowed.

The inner surface of the door 66 may include a deployable vanity mirror 68. The headset storage compartment 60 is preferably positioned to the side of the seat 28 for convenient access and use of the vanity mirror 68 at about eye level with the seated passenger. The door 66 swings open in the direction away from the passenger so that the mirror faces the passenger. The headset storage compartment 60 may include a light and a switch actuated when the door 66 is opened and closed.

Figure 12:
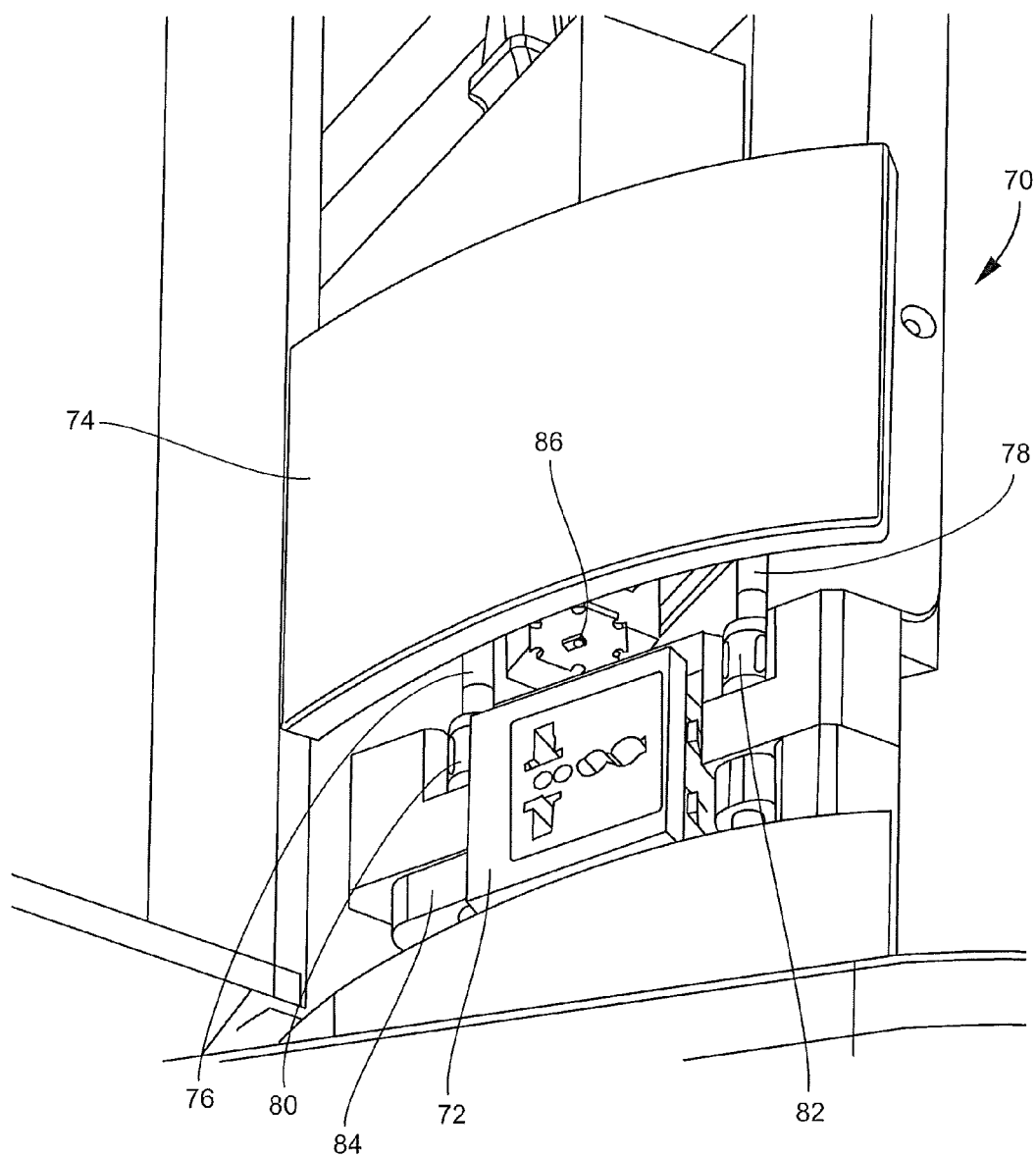
FIG. 12 a detailed view of a combination light, power and data port assembly of one of the suites of FIG. 1.

Referring to FIG. 12, each suite 20A, 20B, 22A, 22B includes a combination power outlet and data port passenger seat accessory shown generally at reference numeral 70. The accessory 70 generally includes a power outlet and data port located in a common housing 72. The power outlet and data port functions to power or charge an electronic device and connects the electronic device to a communication network or media equipment. The housing 72 is shown mounted horizontally within a cabinet, for example, integrated into the cabinetry of the adjacent beverage bar 52. The accessory 70 may be mounted within its own housing or other structures, for example privacy walls, and in other orientations, for example vertically.

The accessory 70 includes a cover 74 configured to slide vertically between opened and closed positions to reveal the underlying (i.e. rearwardly positioned) housing 72. As shown, the cover 74 is configured to slide vertically upward to reveal the housing 72 and vertically downward to conceal the housing. The cover 74 as shown has a slight curvature to follow the curvature of the cabinetry. The cover 74 may have clearance above to permit movement vertically upward without blocking another accessory.

The cover 74 has a flange projecting perpendicularly from the backside thereof for securing first and second spaced linear rods 76, 78 to the cover. The first and second linear rods 76, 78 travel vertically within first and second respective corresponding sleeves 80, 82. The linear rods 76, 78 may be steel for rigidity, among other materials. The sleeves 80, 82 may include bearings to provide a smooth transition. The first and second sleeves 80, 82 are attached to the cabinetry or other support surface.

The bottom of the rods 76, 78 are tied together with a bridge 84 that interacts with other structure to hold the cover 74 in the open and closed positions. Other structure can include magnets or mechanical detents positioned adjacent the bridge positions that correspond with the opened and closed positions of the cover 74. The vertical bearing design for the movement of the cover 74 precludes the need for visible grooves and attachment features normally found with a sliding cover. The cover 74 translates vertically to avoid encroachment into the suite, reducing injury from impact.

The accessory 70 may further include a light, such as an embedded LED light 86, located inside the cover 74 that lights the power outlet and data port for better visibility when the cover is open. The cover 74 slides to expose the power outlet/data port housing 72. The power outlet and data port can function to charge/connect electronic devices such as cell phones, tablets, laptops and other electronic devices. The power outlet and data port is located in the vicinity of the countertop 54 such that electronic devices connected to and being charged can sit on the countertop or auxiliary table. In this manner, electrical cords associated with the electronic devices are not strung across the suite.

A premium class passenger seating arrangement including suites having various passenger amenities is described above. Various details of the invention may be changed without departing from the scope of the invention. Furthermore, the foregoing description of the preferred embodiment of the invention and the best mode for practicing the invention are provided for the purpose of illustration only and not for the purpose of limitation.

What is claimed is:

1. A premium class aircraft passenger seating arrangement, comprising:
   a first suite bound by one or more privacy walls defining a seating area including a seat configured to achieve a horizontal bed position and a living area positioned to a side of the seating area and including at least one amenity for use by a passenger in the first suite; and
   a second suite adjacent the first suite bound by one or more privacy walls defining a seating area and including a seat configured to achieve a horizontal bed position and a living area positioned to a side of the seating area and including at least one amenity for use by a passenger in the second suite, the living area having open floor space, and an entrance to the seating area from an aisle being provided through the living area;
   wherein the first and second suits share a privacy wall separating the seating area of the first suite from the living area of the second suite and the living area of the first suite from the seating area of the second suite, the first and second suites overlapping in a longitudinal direction and the seats of the first and second suites positioned facing in a direction of one another and laterally offset about a longitudinal axis of the first and second suites; and
   wherein an entrance into the first suite is through the seating area of the first suite and an entrance into the second suite is through the living area of the second suite.

2. The seating arrangement of claim 1, wherein the living area of the first suite shares a privacy wall with a living area of a third suite that is laterally adjacent the first suite and is a mirror image of the first suite, and the seating area of the second suite shares a privacy wall with a seating area of a fourth suite that is laterally adjacent the second suite and is a mirror image of the second suite.

3. The seating arrangement of claim 1, wherein each of the first and second suites include a closet positioned to the side of the seat, an ottoman positioned forward of and apart from the seat, the ottoman and the seat residing in a common horizontal plane when the seat is in the horizontal bed position, and a video monitor positioned forward of the seat and vertically above the ottoman.

4. The seating arrangement of claim 1, wherein the at least one amenity in the living area of each of the first and second suites includes a headset storage compartment recessed within the one or more privacy walls and accessible through a door that pivots open and closed.

5. The seating arrangement of claim 1, wherein the at least one amenity in the living area of each of the first and second suites includes a beverage bar having a door configured to pivot open to provide an auxiliary horizontal table vertically spaced from an underlying countertop to permit simultaneous use of the auxiliary horizontal table and the underlying countertop.

6. The seating arrangement of claim 1, wherein the at least one amenity in the living area of each of the first and second suites includes a combination power outlet and data port integrated into the one or more privacy walls and accessible through a vertically sliding cover.

7. The seating arrangement of claim 1, wherein the at least one amenity in the living area of each of the first and second suites includes a suite control panel positioned forward of the seat in a location reachable by a seated passenger.

8. An aircraft passenger suite seating arrangement, comprising:
   a first passenger suite including a seating area and a living area positioned to the side of the seating area, the seating area including a seat and the living area including at least one passenger amenity;
   a second passenger suite longitudinally adjacent the first passenger suite and including a seating area and a living area positioned to the side of the seating area, the seating area including a seat and the living area including at least one passenger amenity, the living area having open floor space and an entrance to the seating area from an aisle being provided through the living area, and the first and second passenger suites separated by a shared privacy wall, and the seats in the first and second passenger suites arranged facing each other and laterally offset about a longitudinal axis;
   a third passenger suite laterally adjacent the first passenger suite and including a seating area and a living area positioned to the side of the seating area, the seating area including a seat and the living area including at least one passenger amenity, the living areas of the first and third passenger suites separated by a shared privacy wall and the seats in the first and third passenger suites arranged facing in the same direction; and
   a fourth passenger suite longitudinally adjacent the third passenger suite and laterally adjacent the second passenger suite, the fourth passenger suite including a seating area and a living area positioned to the side of the seating area, the seating area including a seat and the living area including at least one passenger amenity, the living area having open floor space and an entrance to the seating area from an aisle being provided through the living area, and wherein the seating areas of the second and fourth passenger suites are separated by a shared privacy wall and the seats in the second and fourth passenger suites are arranged facing in the same direction.

9. The seating arrangement of claim 8, wherein each of the first and third passenger suites include a closet in their respective seating areas, and each of the second and fourth passenger suites include a closet in their respective living area.

10. The seating arrangement of claim 8, wherein the shared privacy wall separating the first and second passenger suites separates the seating area of the first passenger suite from the living area of the second passenger suite and the living area of the first passenger suite from the seating area of the second passenger suite.

11. The seating arrangement of claim 8, wherein each of the first, second, third and fourth passenger suites includes at least one of an ottoman, a video monitor, a headphone storage compartment, and a beverage bar.

\* \* \* \* \*